(12) United States Patent
Wan et al.

(10) Patent No.: US 12,228,456 B2
(45) Date of Patent: Feb. 18, 2025

(54) WATER THERMOMETER

(71) Applicant: SHENZHEN COOTWAY TECHNOLOGY CO., LTD., Shenzhen (CN)

(72) Inventors: Gangbin Wan, Deyang (CN); Benqiang Yin, Deyang (CN)

(73) Assignee: SHENZHEN COOTWAY TECHNOLOGY CO., LTD., Shenzhen (CN)

( * ) Notice: Subject to any disclaimer, the term of this patent is extended or adjusted under 35 U.S.C. 154(b) by 667 days.

(21) Appl. No.: 17/485,757

(22) Filed: Sep. 27, 2021

(65) Prior Publication Data
US 2022/0155154 A1    May 19, 2022

(51) Int. Cl.
*G01K 1/14*    (2021.01)
*G01K 13/02*    (2021.01)

(52) U.S. Cl.
CPC ............... *G01K 1/14* (2013.01); *G01K 13/02* (2013.01); *G01K 2215/00* (2013.01)

(58) Field of Classification Search
CPC ....... G01K 1/14; G01K 13/02; G01K 2215/00
See application file for complete search history.

(56) References Cited

U.S. PATENT DOCUMENTS

| | | | | |
|---|---|---|---|---|
| 2,641,930 A | * | 6/1953 | Kebbon | G01K 5/00 374/E5.001 |
| 3,961,531 A | * | 6/1976 | Peng | G01K 1/14 374/208 |
| 2015/0323389 A1 | * | 11/2015 | Dayan | G01K 13/00 374/156 |

FOREIGN PATENT DOCUMENTS

| | | | | |
|---|---|---|---|---|
| CN | 203259257 U | * | 10/2013 | ............... G01K 1/06 |
| KR | 20190105905 A | * | 9/2019 | |

* cited by examiner

*Primary Examiner* — Mirellys Jagan
(74) *Attorney, Agent, or Firm* — Hemisphere Law, PLLC; Zhigang Ma

(57) ABSTRACT

A water thermometer includes a housing; a thermometer assembly arranged in the housing; a suspending part, connected to the housing; and a lighting assembly arranged in the suspending part and configured to illuminate the thermometer assembly.

15 Claims, 15 Drawing Sheets

WATER THERMOMETER

FIELD OF THE INVENTION

The subject matter herein generally relates to thermometers, and more particularly to a water thermometer.

BACKGROUND OF THE INVENTION

A thermometer is a tool that can accurately judge and measure temperature. It is divided into pointer thermometers and digital thermometers. According to different purposes, a variety of thermometers have been developed. Water thermometers can measure the temperature of water and are widely used in rivers, wells, fish ponds, oceans, and the like, usually being capable of measuring temperature ranges between −40° C. and 125° C.

At present, existing water thermometers on the market are used with an animal shape floating on water, and a thermometer connected with the animal shape is sunk in the water. It is difficult to read the thermometer when the water thermometer is used at night. Therefore there is a need for a water thermometer which can solve the problem.

SUMMARY OF THE INVENTION

A water thermometer includes a housing; a thermometer assembly arranged in the housing; a suspending part connected to the housing; and a lighting assembly arranged in the suspending part and configured to illuminate the thermometer assembly.

In at least one embodiment, the water thermometer further includes a mounting plate arranged in the housing, wherein the thermometer assembly is mounted on the mounting plate.

In at least one embodiment, the mounting plate defines a mounting groove, and the thermometer assembly is engaged in the mounting groove.

In at least one embodiment, the mounting plate is provided with at least two elastic fasteners configured to fasten the thermometer assembly onto the mounting plate.

In at least one embodiment, the water thermometer further includes a protective case arranged in the housing, wherein the mounting plate is received in the protective case.

In at least one embodiment, the water thermometer further includes weights arranged at a bottom end of the housing away from the suspending part.

In at least one embodiment, the water thermometer further includes a bottom base connected to the bottom end of the housing, wherein the weights are arranged in the bottom case.

In at least one embodiment, the suspending part is in a shape of animal figurine or in a sphere shape.

In at least one embodiment, the lighting assembly comprises a circuit board, at least one LED lamps arranged at the circuit board, and a battery electrically connected to the circuit board.

In at least one embodiment, the lighting assembly further comprises a mounting base, the suspending part and the housing are connected to two opposite sides of the mounting base, the circuit board is connected at the mounting base.

In at least one embodiment, the at least one LED lamp comprises a first LED lamp arranged on a lower side of the circuit board away from the suspending part, the mounting base defines a light-transmitting part corresponding to the first LED lamp and configured to allow light emitted by the first LED lamp to pass through the light-transmitting part to illuminate the thermometer assembly.

In at least one embodiment, the at least one LED lamp further comprises a second LED lamp arranged on an upper side of the circuit board away from the mounting base.

In at least one embodiment, the second LED lamp is a hollow structure in a shape of cylinder extending upwardly from the circuit board, the battery is arranged inside the second LED lamp.

In at least one embodiment, the lighting assembly further comprises a first solar plate arranged at an upper end of the second LED lamp away from the circuit board.

In at least one embodiment, the lighting assembly further comprises a first solar plate arranged at an upper end of the circuit board away from the mounting base.

In at least one embodiment, the first solar plate is attached to the circuit board through an ethylene vinyl acetate mat.

In at least one embodiment, the lighting assembly further comprises a lampshade connected at the mounting base and configured to cover the lighting assembly.

In at least one embodiment, the lighting assembly further comprises a second solar plate arranged at an upper end of the lampshade away from the mounting base.

In at least one embodiment, the lighting assembly further comprises a control assembly, the mounting base defines a through hole, the control assembly comprises a silicon button extending through the through hole and a key structure electrically connected at the circuit board, the silicon button corresponds to the key structure and configured to activate the key structure when being pressed to light on/off the at least one LED lamp.

In at least one embodiment, the water thermometer further includes a sealing ring arranged between the mounting base and the suspending part to prevent water entering the suspending part.

The lighting assembly can emit light so as to illuminate the suspending part and the thermometer assembly, which is convenient for use in a dark environment.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE ILLUSTRATED EMBODIMENTS

Figure 1:
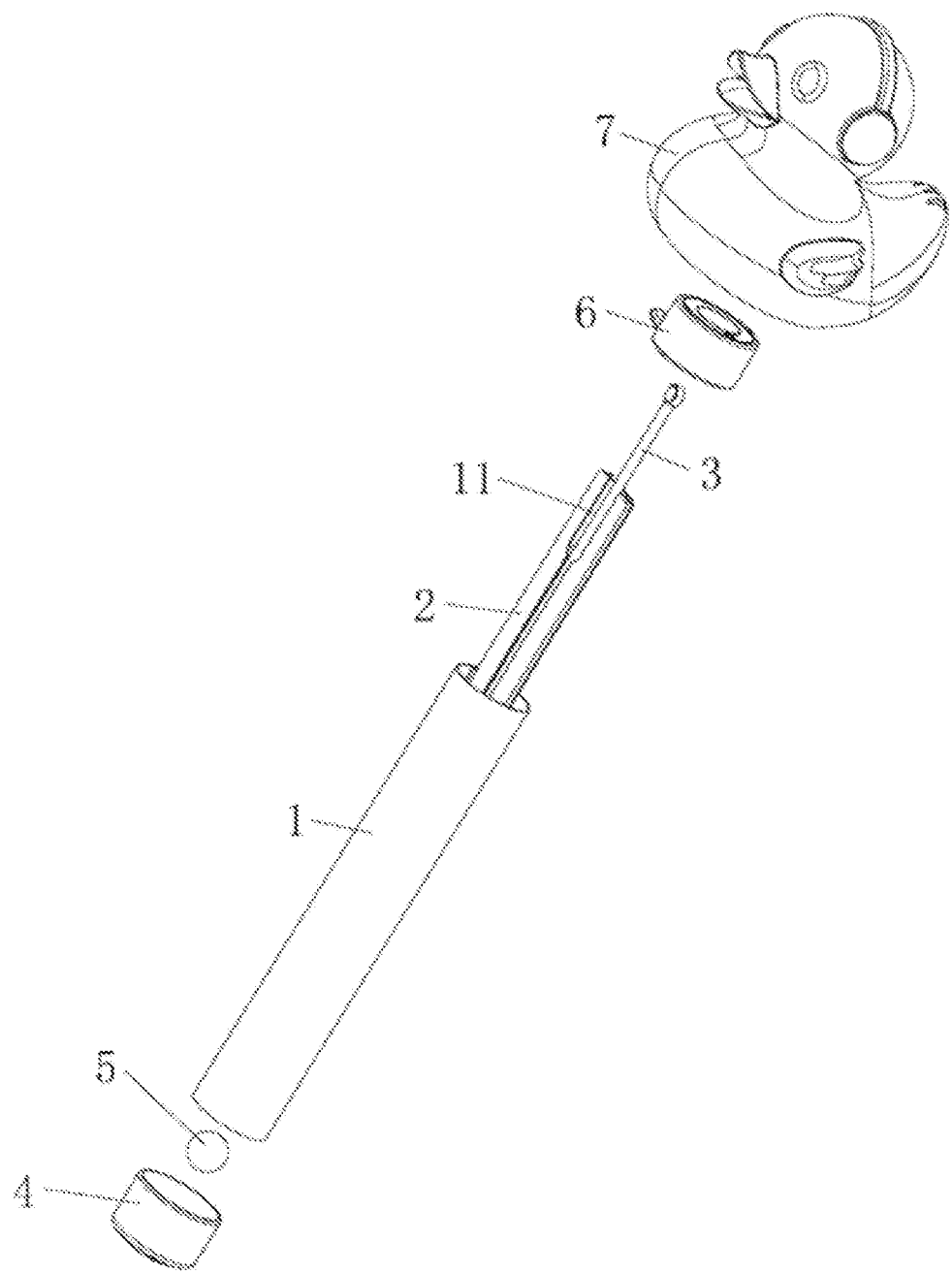
FIG. 1 is a schematic view of a water thermometer according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Figure 2:
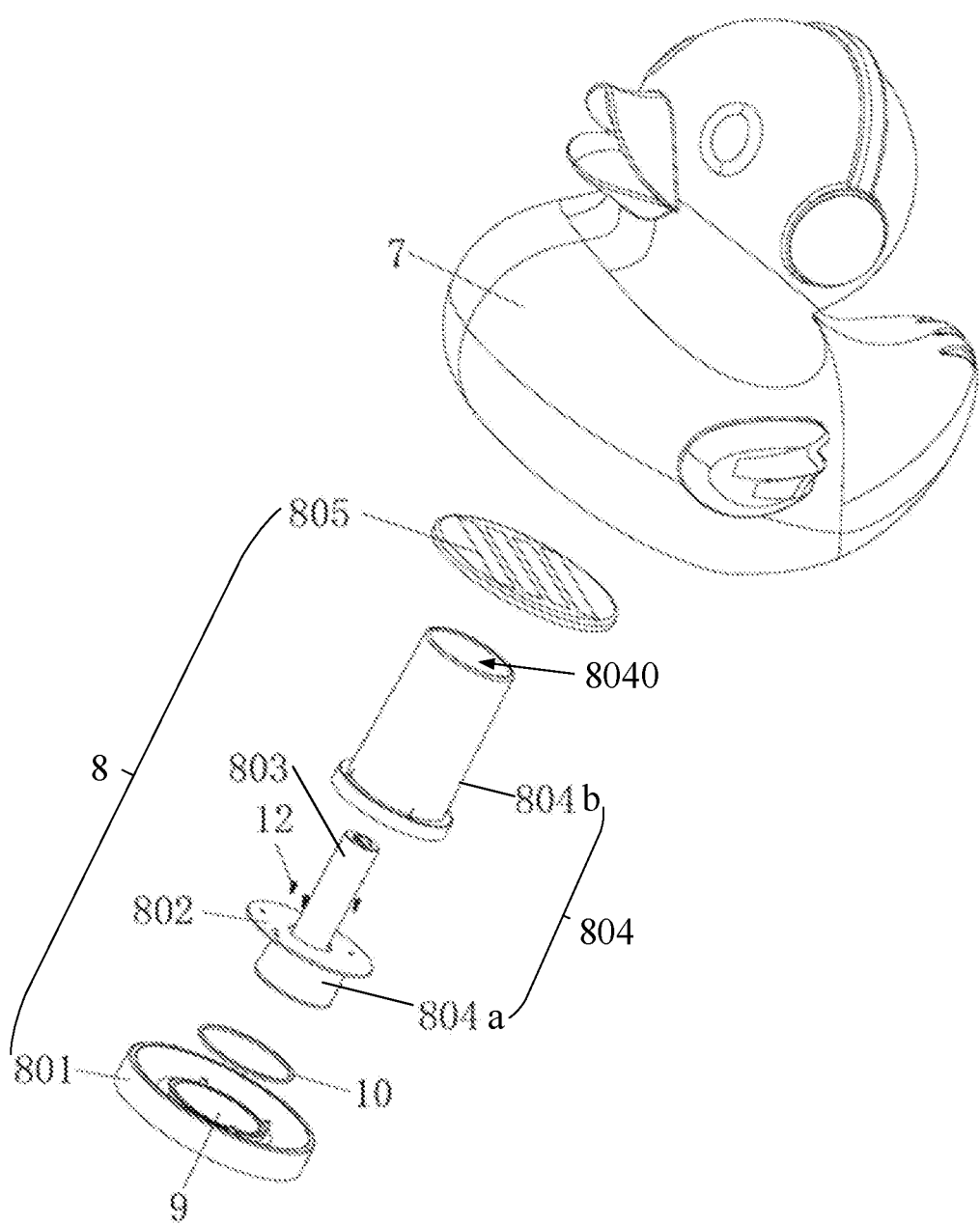
FIG. 2 is an exploded view of the water thermometer of FIG. 1.
Figure 3:
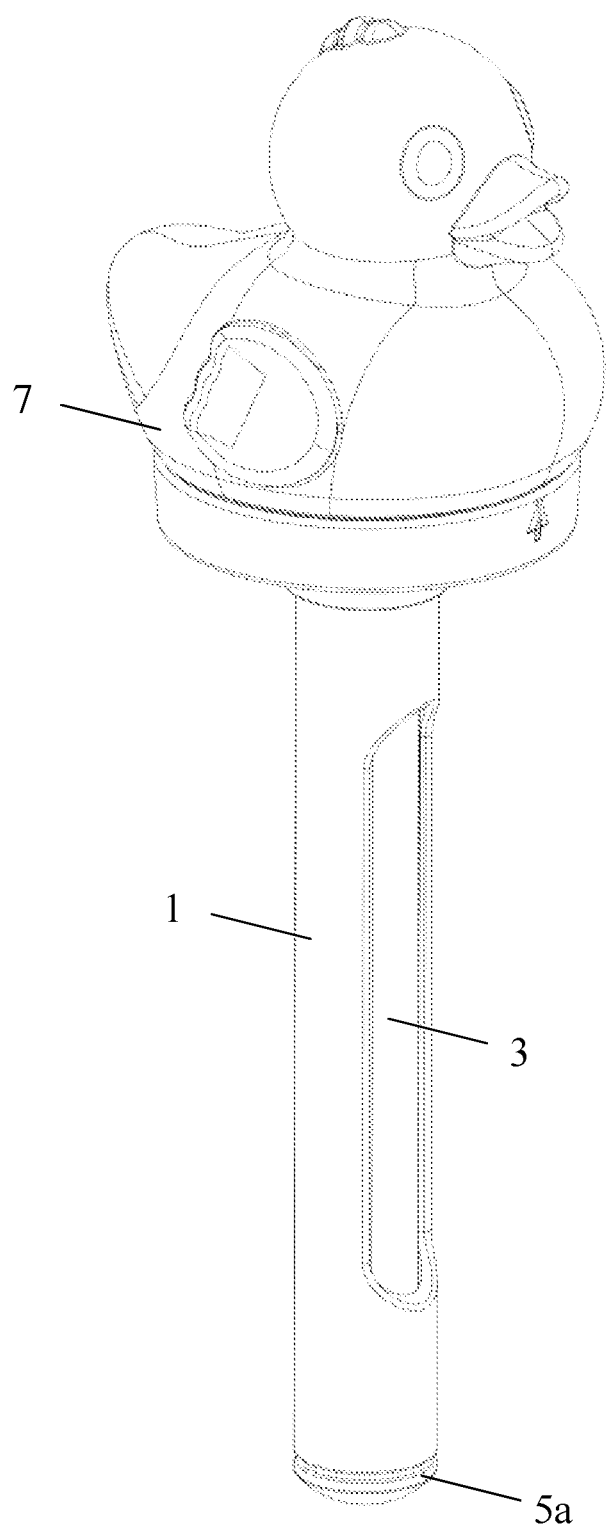
FIG. 3 is a schematic view of a water thermometer according to a second embodiment of the present disclosure, the water thermometer including a housing and a thermometer mounted in the housing through a mounting plate.
Figure 4:
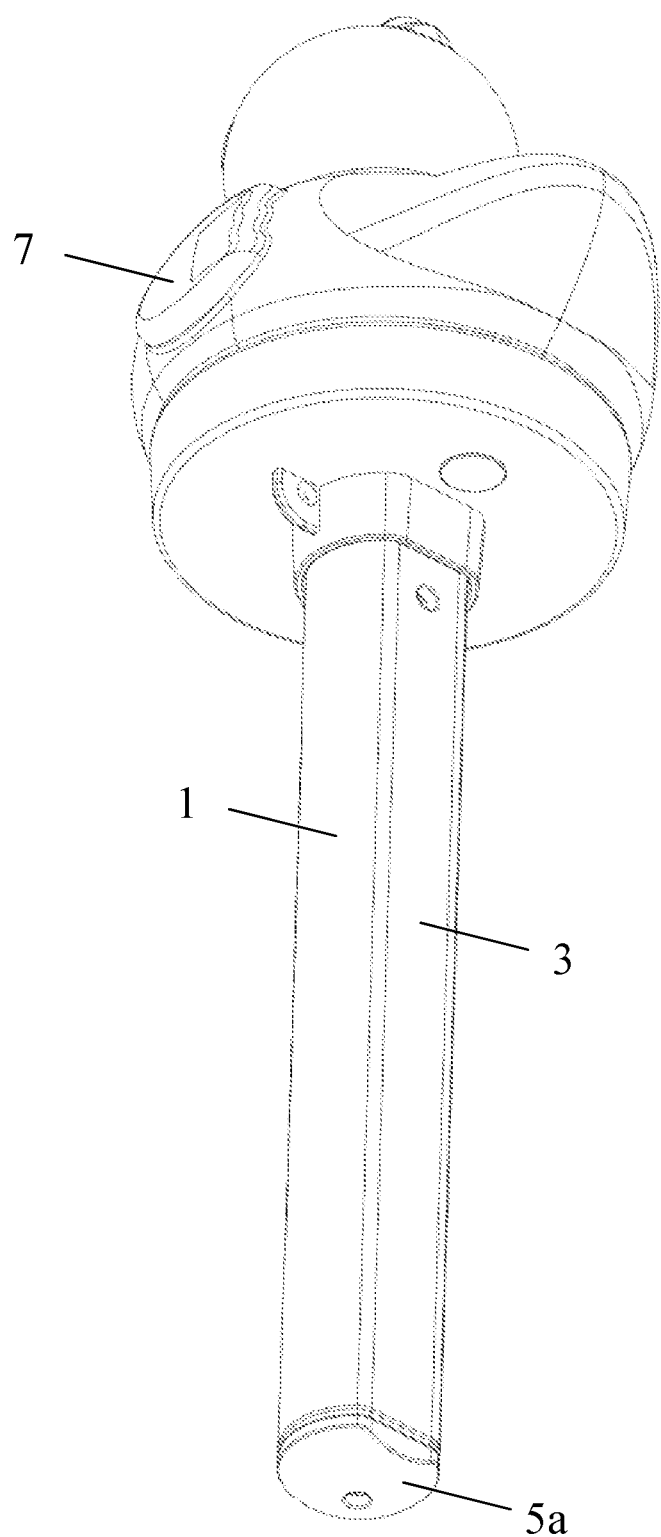
FIG. 4 is a schematic view of the water thermometer of FIG. 3 taken from another view.
Figure 5:
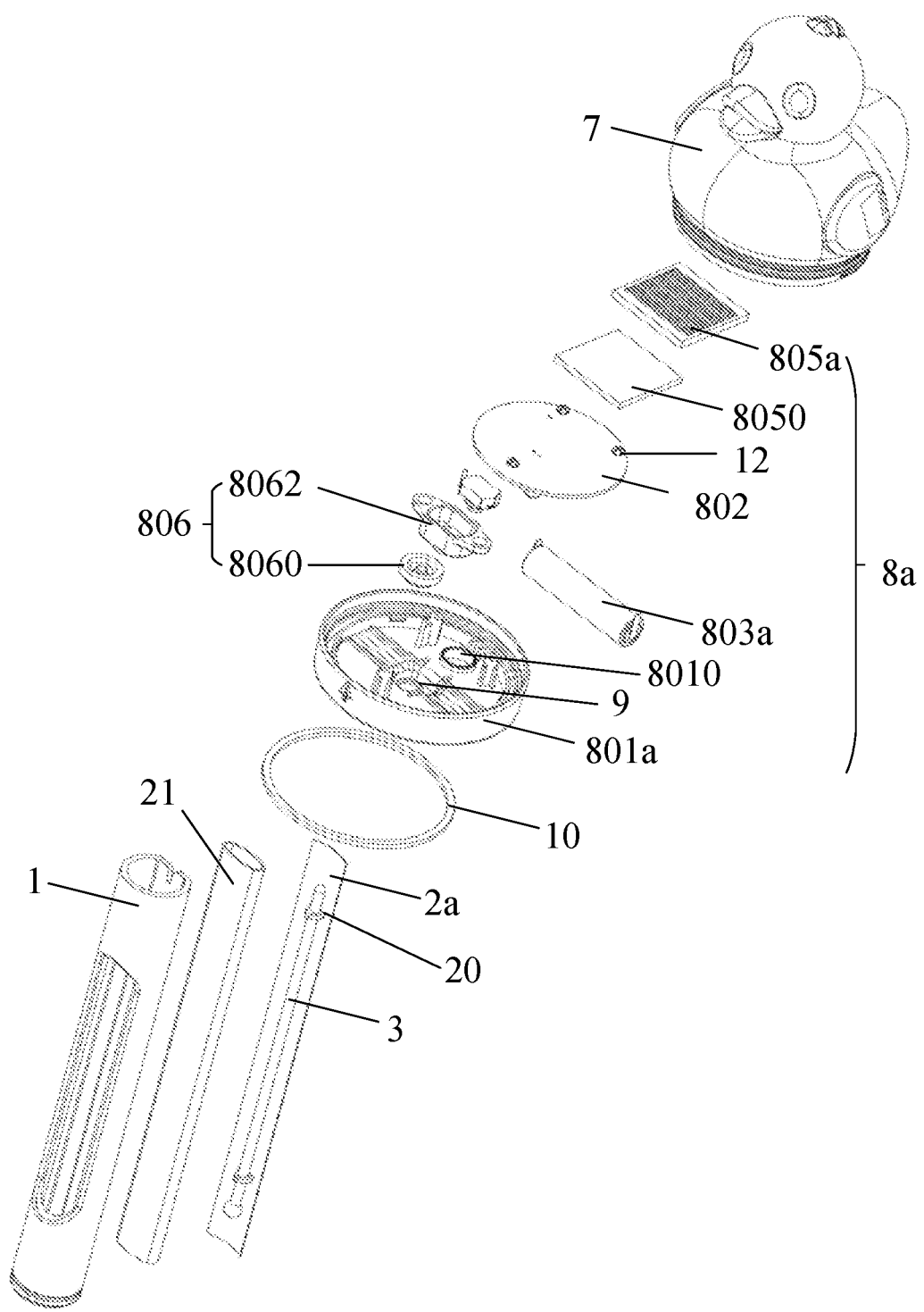
FIG. 5 is an exploded view of the water thermometer of FIG. 3.
Figure 6:
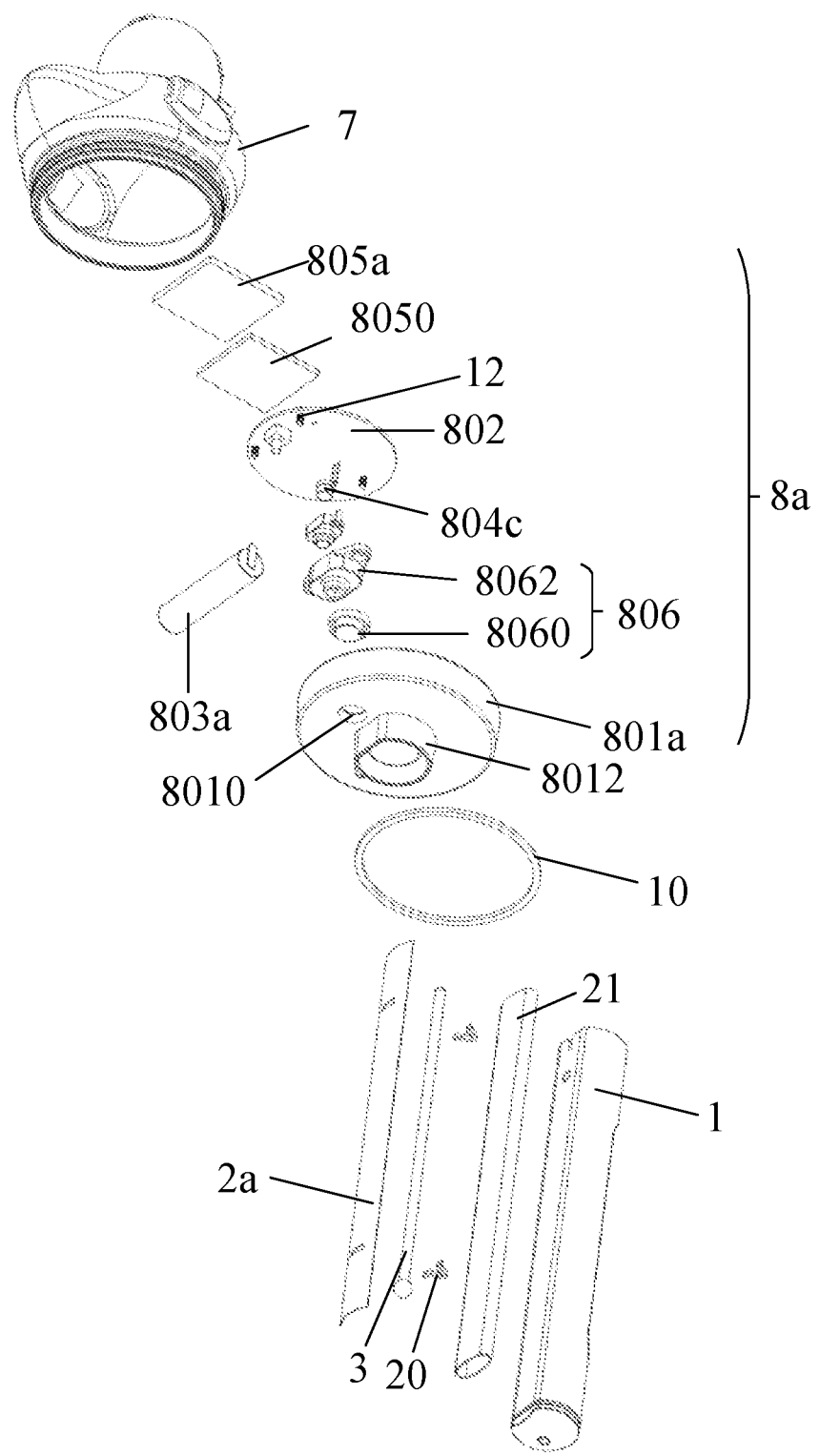
FIG. 6 is an exploded view of the water thermometer of FIG. 3 from another view.
Figure 7:
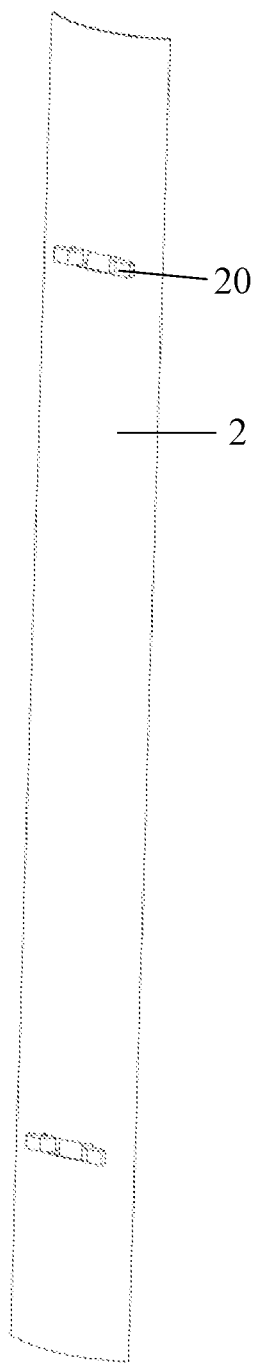
FIG. 7 is a schematic view of an exemplary embodiment of the mounting plate.
Figure 8:
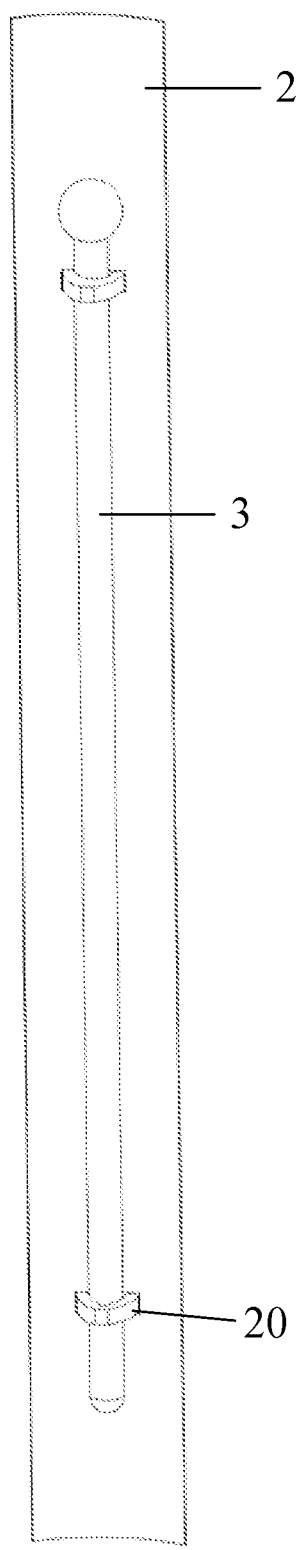
FIG. 8 is a schematic view of the mounting plate with the thermometer mounted thereon.
Figure 9:
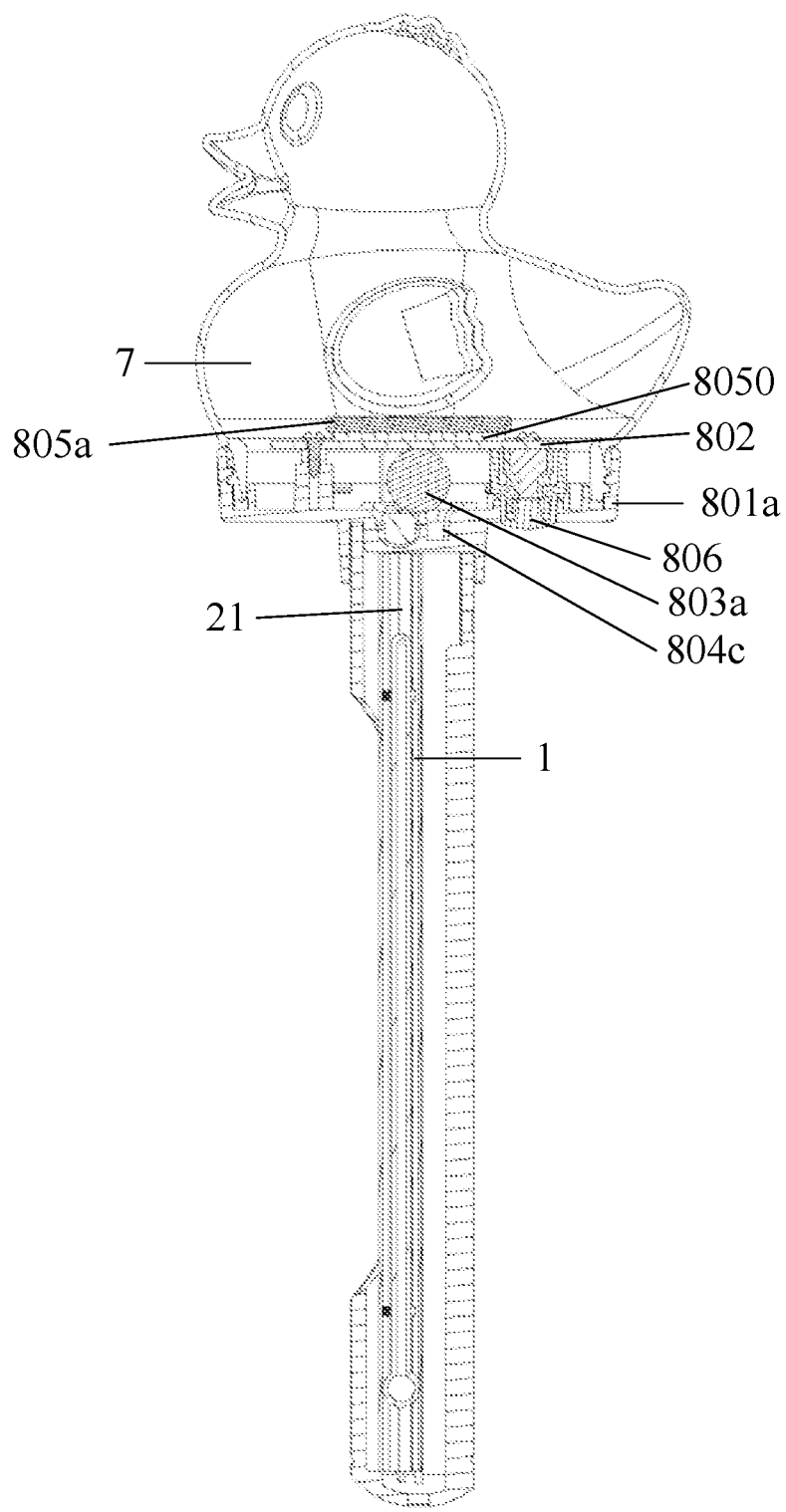
FIG. 9 is a cross-sectional view of the water thermometer of FIG. 3.

Referring to FIGS. 1-2, FIG. 1 shows a schematic view of a water thermometer provided by a first embodiment of the present disclosure. FIG. 2 show an exploded view of the water thermometer of FIG. 1. The water thermometer includes a housing 1, a thermometer assembly 3 arranged inside the housing 1, a suspending part 7 connected to an end of the housing 1, and a lighting assembly 8 is arranged inside the suspending part 7. Through such arrangement, the lighting assembly 8 can emit light so as to illuminate the suspending part 7 and the thermometer assembly 3, which is convenient for use at dark environment.

In at least one embodiment, the housing 1 is made of transparent material (such as transparent resin) or light-transmitting material so that the thermometer assembly 3 in the housing 1 can be illuminated and is easy to be read. The housing 1 is a hollow structure and is in a substantially cylindrical shape. The housing 1 defines a window corresponding to the scale of the thermometer assembly 3, which is convenient for reading the thermometer assembly 3 more clearly.

In at least one embodiment, a mounting plate 2 is arranged in the housing 1 and the thermometer assembly is mounted on the mounting plate 2. Such arrangement helps to secure the thermometer in the housing 10. In at least one further embodiment, the mounting plate 2 defines a mounting groove 11, the thermometer assembly 3 is engaged in the mounting groove. Such arrangement helps to secure the thermometer assembly more steadily.

In at least one embodiment, a bottom base 4 is connected to the other end of the housing 1. Weights 5 are arranged at the bottom base 4 and configured to keep the water thermometer in position when in use. In at least one embodiment, the weights 5 are arranged at an inner wall of the bottom base 4.

The suspending part 7 can be made of transparent material or light-transmitting material (such as transparent resin), which allow light emitted by the lighting assembly 8 to illuminate the dark environment. The suspending part 7 is a hollow structure defining an accommodating space and the lighting assembly 8 is arranged in the accommodating space. The suspending part 7 can be in a shape of a sphere or an animal figurine like a duck figurine, an octopus figurine. In the embodiment shown in FIGS. 1 and 2, the suspending part 7 is in a shape of duck figurine, which can improve aesthetics of the water thermometer.

In at least one embodiment, the lighting assembly 8 can include a circuit board 802, a battery 803 and two LED lamps 804. The battery 803 and the two LED lamps 804 are electrically connected to the circuit board 802. The battery 803 provides power to the circuit board and the two LED lamps 804. In at least one embodiment, the two LED lamps 804 are arranged on two opposite sides of the circuit board 802. In detail, the two LED lamps 804 includes a first LED lamp 804a and a second LED lamp 804b. The first LED lamp 804a is configured to illuminate the thermometer assembly 3 and the second LED lamp 804b is configured to illuminate the suspending part 7.

In at least one embodiment, the lighting assembly 8 further includes a mounting base 801 connected to the suspending part 7. In at least one embodiment, the suspending part 7 defines an opening at a lower side thereof, and the mounting base 801 is connected to the lower side of the suspending part 7 to seal the suspending part 7. In at least one embodiment, a sealing ring 10 is arranged between the mounting base 801 and the suspending part 7 so as to further improve waterproof performance. Therefore, when the water thermometer is in use, water is prevented from entering the accommodating space of the suspending part 7. An upper side of the mounting base 801 is configured to connect the circuit board 802, and a lower side of the mounting base 801 is connected to the housing 1 so as to interconnect the housing 1 and the suspending part 7.

The circuit board 802 can be connected to the mounting base 801 through fixing elements 12 such as screws. Through the fixing elements 12, the circuit board 802 can be detachably connected to the mounting base 801, which is convenient for maintenance of the circuit board 802.

The first LED lamp 804a is arranged on a lower surface of the circuit board 802. The mounting base 801 defines a light-transmitting part 9 corresponding to the first LED lamp 804a. The light emitted by the first LED lamp 804a can pass through the light-transmitting part 9 to illuminate the thermometer assembly 3. In at least one embodiment, the first LED lamp 804a extends from the circuit board 802 into the light-transmitting part 9.

The second LED lamp 804b surrounds the battery 802 and is arranged on an upper surface of the circuit board 802. In at least one embodiment, the battery 802 is arranged at a center of the circuit board 802. The first LED lamp 804a is a hollow structure and defines a center hole 8040, the battery 803 extends from the circuit board 802 into the center hole 8040. An extension direction of the battery 803 is substantially perpendicular to the upper surface of the circuit board 802. Such arrangement is beneficial for minimizing overall size of the lighting assembly 8.

In at least one embodiment, the lighting assembly 8 further includes a solar panel 805 configured to absorb the sun's rays as a source of energy and generate electricity to charge the battery 803. The solar panel 805 is electrically connected to the circuit board 802 so as to charge the battery 803, which can prolong service life of the battery 803 and does not need to replace the battery 803 frequently. Since the suspending part 7 is made of transparent material or light-transmitting material, the solar panel 805 can be fully illuminated by the sun.

In at least one embodiment, the suspending part 7 is connected to the housing 1 through a connecting base 6. The suspending part 7 is connected to an upper side of the connecting base 6, and the housing 1 is connected to a lower side of the connecting base 6. In detail, the upper side of the connecting base is connected to the mounting base 801. The mounting base 801 and the connecting base 6 can be connected through threading structures, fasteners or other suitable structures. Through the connecting base 6, adaptability of the water thermometer is improved. For example, the housing 1 can be connected to different suspending part 7 or the suspending part 7 can be connected to different housing 1 by changing corresponding connecting base.

Referring to FIGS. 3-9, a second embodiment of the present disclosure provides a water thermometer. The water thermometer includes a suspending part 7, a lighting assembly 8 arranged in the suspending part 7, a housing 1, and a thermometer assembly 3 arranged in the housing 1. In order for simplify, the element with the same numerical reference throughout all the drawings and all the embodiments has same features including structures, functions, locations. It will not be repeated in different embodiments. For example, the suspending part 7 and the housing 1 can be the same with that illustrated in the first embodiment.

The mounting plate 2a is provided with at least two elastic fasteners 20 configured to fasten the thermometer assembly 3 onto the mounting plate. In at least one embodiment, a protective case 21 is mounted in the housing and configured to receive the thermometer assembly therein. The protective case 21 can protect the thermometer assembly 3 from damage. It should be understood that the protective case 21 is transparent so that the thermometer assembly 3 can be read clearly from outside of the protective case 21.

Weights 5a are arranged at a lower end of the housing 1 to make the thermometer assembly sunk in liquid when in use. The weights 5a can be attached at an outer wall of the housing 1 or arranged at an inner wall of the housing 1.

The lighting assembly 8a includes a mounting base 801a, a circuit board 802, a battery 803a, a LED lamp 804c and a solar plate 805a. The housing 1 and the suspending part 7 are respectively connected to two opposite sides of the mounting base 801a. In at least one embodiment, the mounting base 801a is connected to the suspending part 7 via threading structures. In detail, the suspending part 7 includes an outer thread, and the mounting base 801a includes an inner thread. The inner thread engages with the outer thread to connect the mounting base 801a to the suspending part 7. A sealing ring 10 is arranged between the mounting base 801a and the suspending part 7 to improve waterproof performance of the water thermometer. A connecting part 8012 extends away from the mounting base 801a configured to engage with the housing 1. A shape of the connecting part 8012 is matched with that of an upper end of the housing 1, so that the upper end of the housing 1 can be engaged in the connecting part 8012. It should be understood that the connecting part 8012 and the upper end of the housing 1 can be connected via any suitable structures, such as threading structures.

The battery 803a is electrically mounted on a lower side of the circuit board 802. An extending direction of the battery 803a is substantially parallel to a lower surface of the circuit board 802. The LED lamp 804c is electrically connected on the lower side of the circuit board 802. The mounting base 801a defines a light-transmitting part 9 corresponding to the LED lamp 804c, so that light emitted by the LED lamp 804c can pass through the light-transmitting part 9 to illuminate the thermometer assembly 3. The solar plate 805a is attached to the upper side of the circuit board 802 through an ethylene vinyl acetate (EVA) mat 8050. The ethylene vinyl acetate (EVA) mat 8050 can isolate the solar plate 805a from the circuit board 802.

The lighting assembly 8a further includes a control assembly 806 configured to control the LED lamp 804c. The control assembly 806 includes a silicon button 8060 and a key structure 8062 corresponding to the silicon button electrically connected at the circuit board 802. The mounting base 801 defines a through hole 8010. The silicon button 8060 extends through the through hole 8010 so that the silicon button 8060 allows a user to press to switch on/off the LED lamp 804c. For example, when the silicon button 8060 is pressed, the silicon button 8060 moves to push the key structure 8062 to light on the LED lamp 804c; when the silicon button 8060 is pressed again, the silicon button 8060 moves again to push the key structure 8062 to light off the LED lamp 804c. It should be understood, in at least one embodiment, the LED lamp 804 can be automatically switched on/off according to ambient light.

Figure 10:
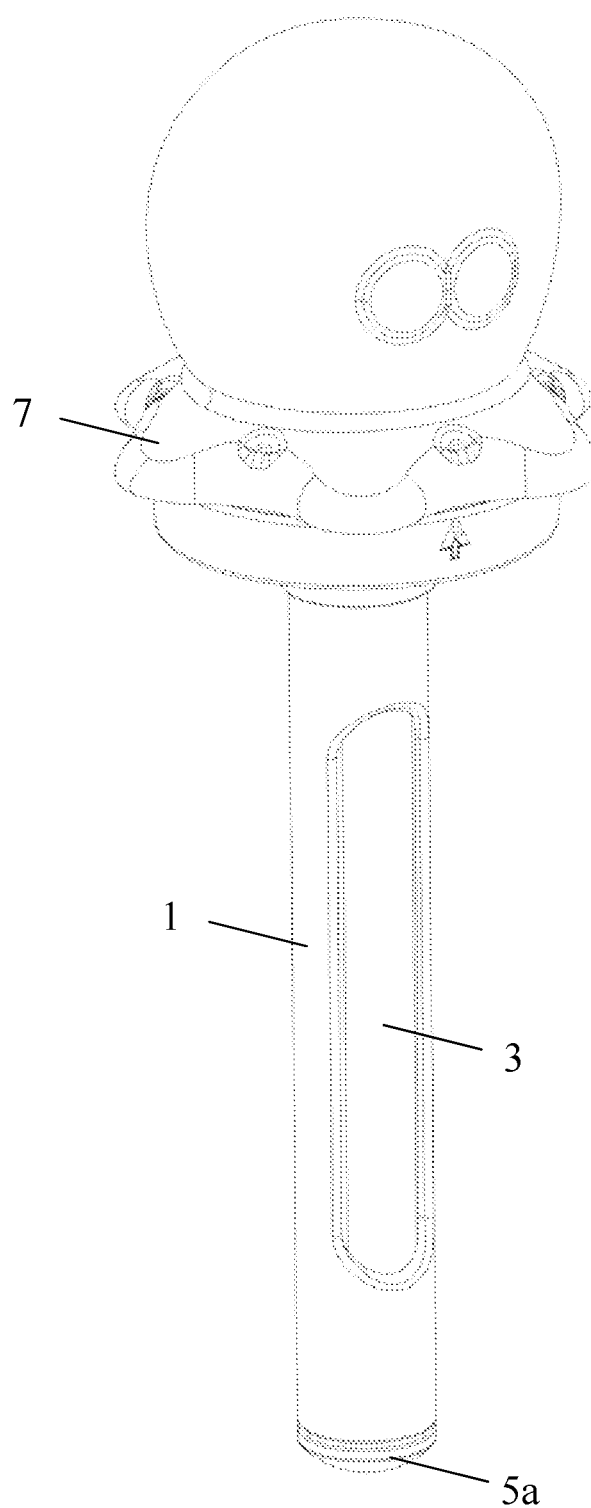
FIG. 10 is a schematic view of a mounting plate according to a third embodiment of the present disclosure.
Figure 11:
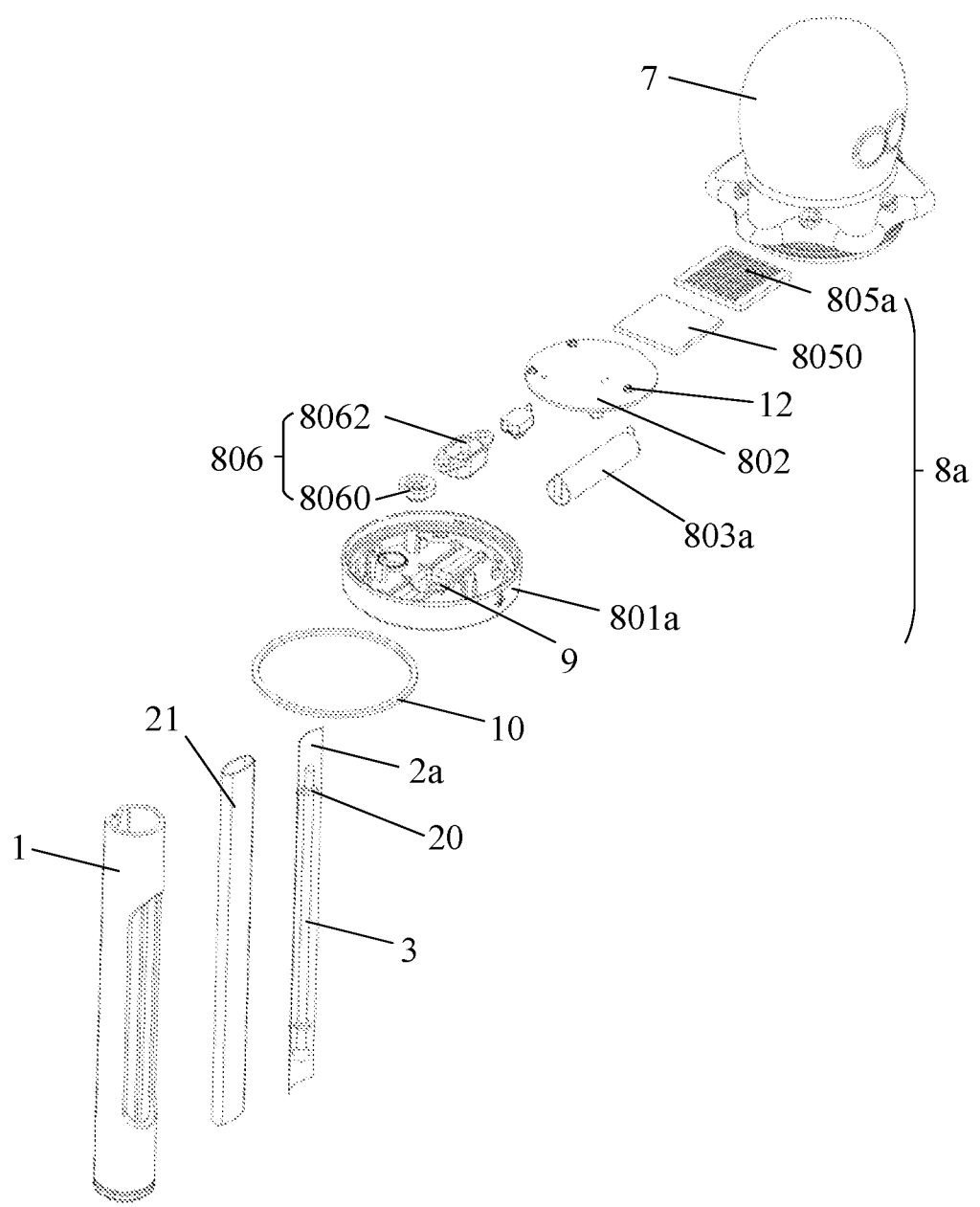
FIG. 11 is an exploded view of the water thermometer of FIG. 10.
Figure 12:
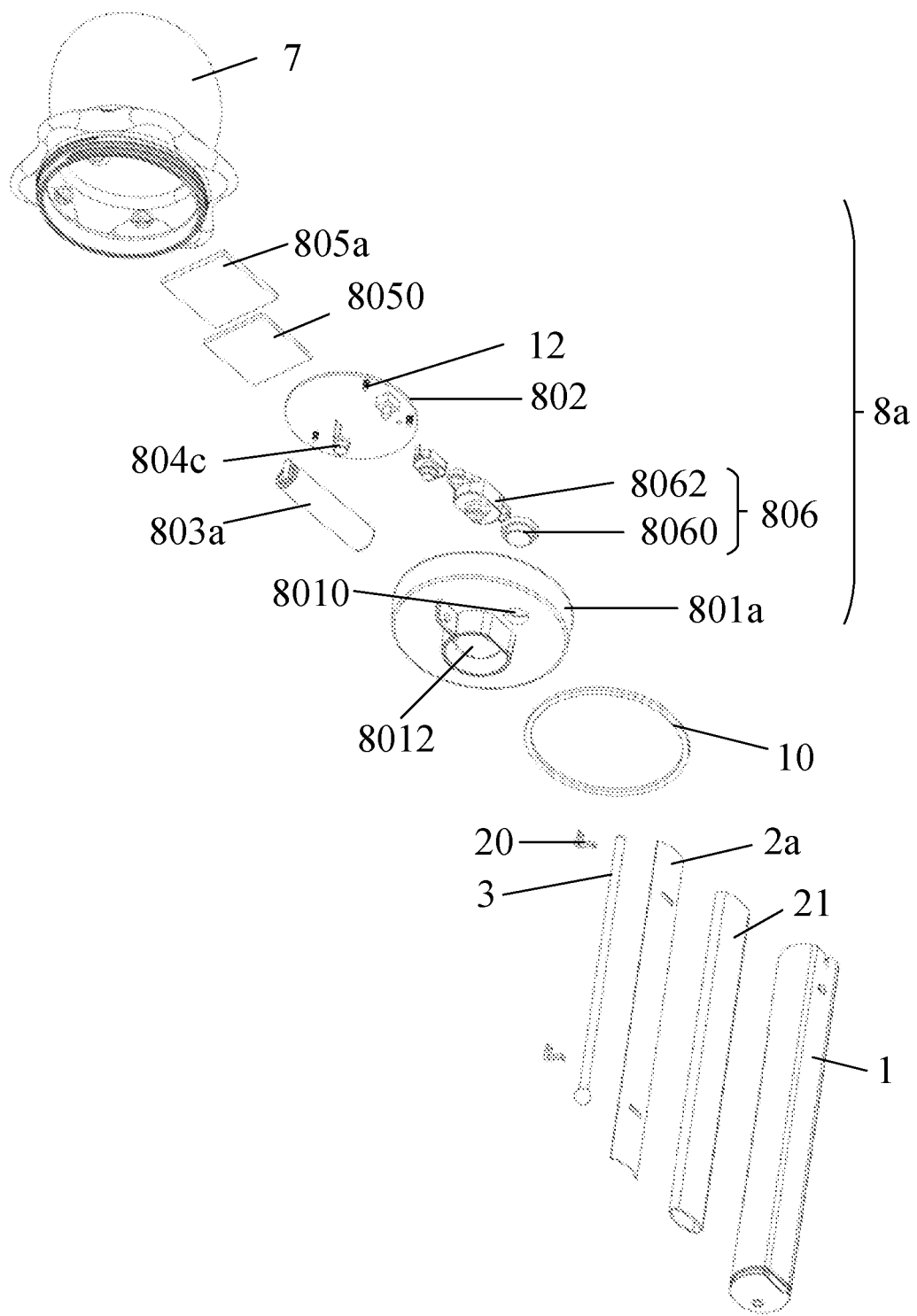
FIG. 12 is an exploded view of the water thermometer of FIG. 10 from another view.

Referring to FIGS. 10-12, a third embodiment of the present disclosure provides a water thermometer. The water thermometer is substantially same with the water thermometer illustrated in the second embodiment. The difference between the third embodiment and the second embodiment is that the suspending part 7 is in a shape of an octopus figurine.

Figure 13:
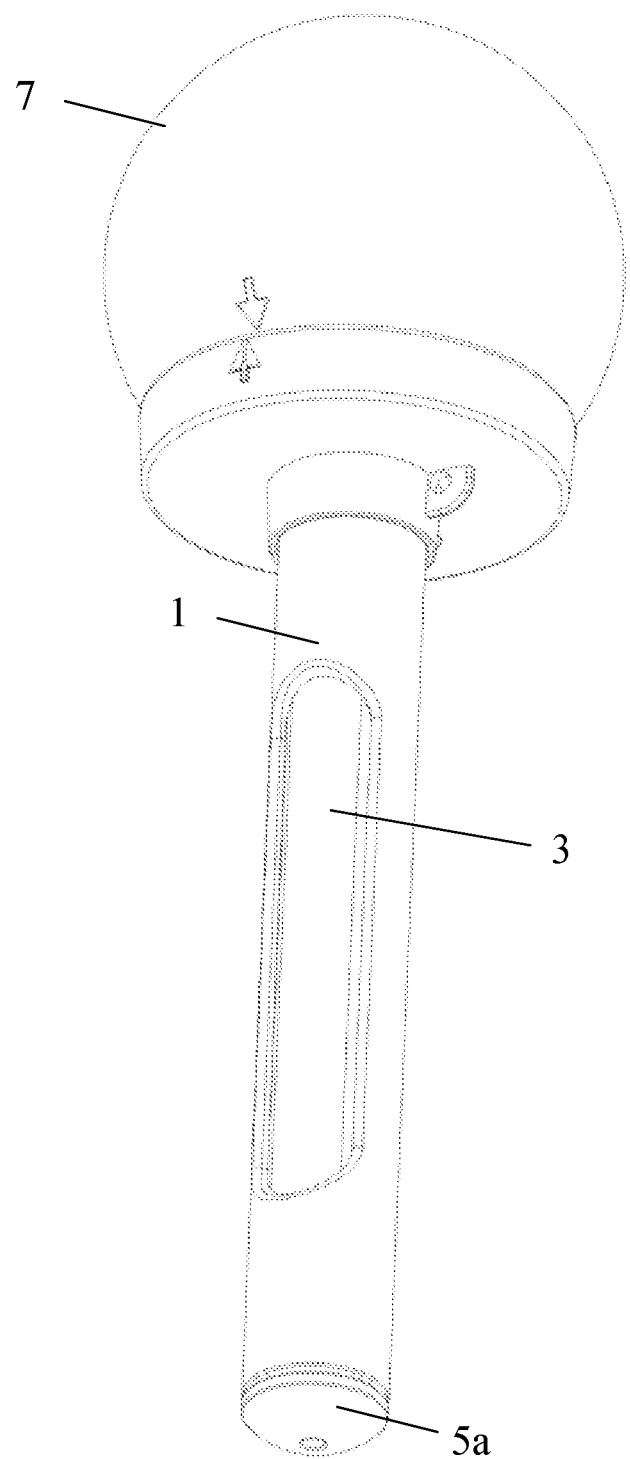
FIG. 13 is a schematic view of a mounting plate according to a fourth embodiment of the present disclosure.
Figure 14:
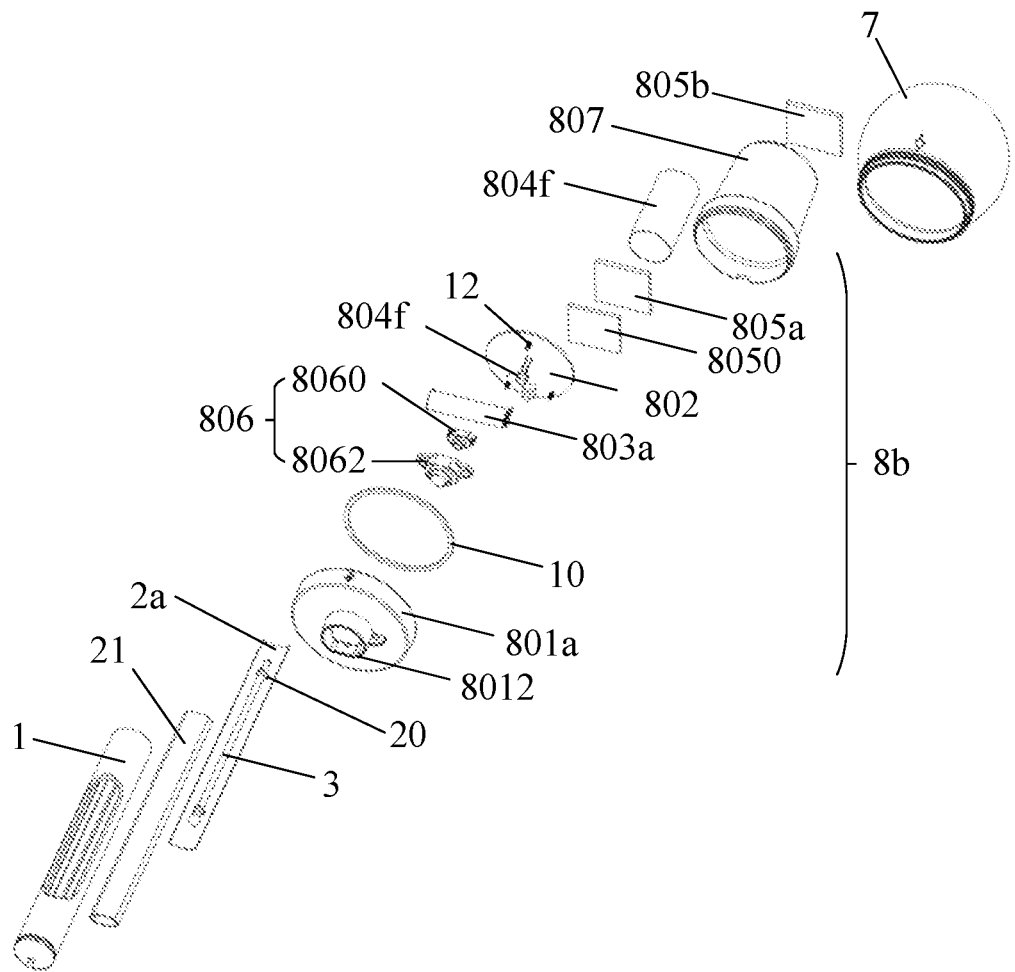
FIG. 14 is an exploded view of the water thermometer of FIG. 13.
Figure 15:
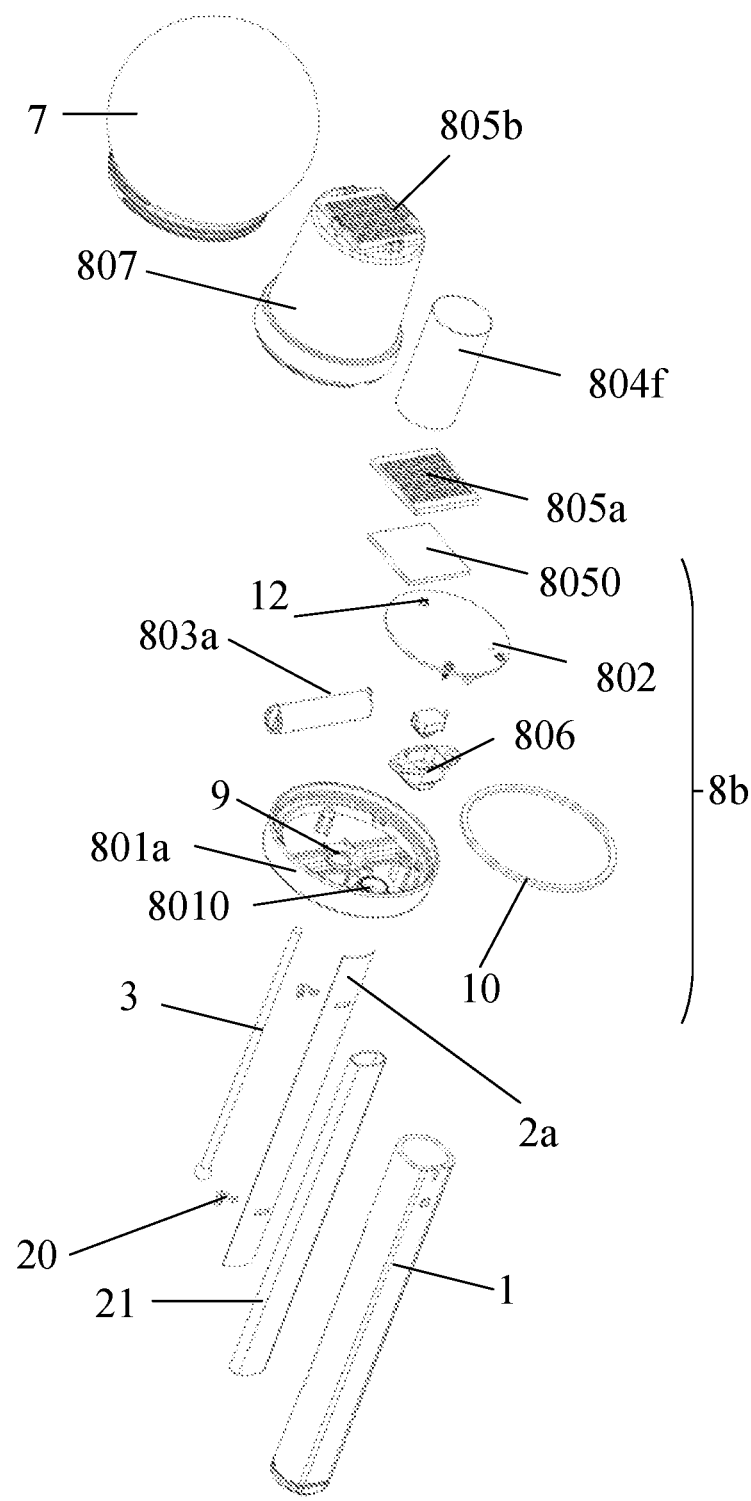
FIG. 15 is an exploded view of the water thermometer of FIG. 13 from another view.

Referring to FIGS. 13-15, a fourth embodiment of the present disclosure provides a water thermometer. The water thermometer includes a housing 1, a thermometer assembly 3 is arranged in the housing, a suspending part 7 and a lighting assembly 8b is arranged in the suspending part 7. The suspending part 7 is in a shape of sphere. It should be understood, the suspending part 7 can be in any suitable shape.

The lighting assembly 8 includes a mounting base 801, a circuit board 802 mounted at the mounting base 801, a battery 803 connected at the lower side of the circuit board 802, a first LED lamp 804e is connected at the lower side of the circuit board 802, a second LED lamp 804f is connected to the upper side of the circuit board 802. A first solar plate 805a is attached on the upper side of the circuit board 802 via the ethylene vinyl acetate (EVA) mat 8050. The second LED lamp 804f is arranged on an upper side of the first solar plate 805a and extends upwardly away from the first solar plate 805a. The lighting assembly 8b further includes a lampshade 807 connected to the mounting base 801a to cover the lighting assembly 8b. A second solar plate 805b is attached to an upper side of the lampshade away from the mounting base 801a. The first solar plate 805a cooperates with the second solar plate 805b can absorb more energy from the sun, thereby further prolonging service life of the battery 803a. The lampshade 807 can make the light emitted by the second LED lamp 804f more uniform. In addition, the lampshade 807 can protect the lighting assembly from damage.

The above description only describes embodiments of the present disclosure, and is not intended to limit the present disclosure, various modifications and changes can be made to the present disclosure. Any modifications, equivalent substitutions, improvements, and the like, made within the spirit and scope of the present disclosure are intended to be included within the scope of the present disclosure.

What is claimed and desired to be protected by Letters Patent, is:

1. A water thermometer, comprising:
    a housing;
    a thermometer assembly arranged in the housing;
    a suspending part connected to the housing; and
    a lighting assembly arranged in the suspending part and configured to illuminate the thermometer assembly;
    wherein the lighting assembly comprises a circuit board, at least one light producing component arranged at the circuit board, and a battery electrically connected to the circuit board;
    wherein the lighting assembly further comprises a mounting base, the suspending part and the housing are connected to two opposite sides of the mounting base, and the circuit board is connected to the mounting base;
    wherein the at least one light producing component comprises a first light producing component arranged on a lower side of the circuit board away from the suspending part, and the mounting base defines a light-transmitting part corresponding to the first light producing component and configured to allow light emitted by the first light producing component to pass through the light-transmitting part to illuminate the thermometer assembly;
    wherein the at least one light producing component further comprises a second light producing component arranged on an upper side of the circuit board away from the mounting base; and
    wherein the second light producing component is a hollow structure in the shape of a cylinder or other hollow extruded geometric shape extending upwardly from the circuit board, the battery being arranged inside the hollow structure along with the second light producing component.

2. The water thermometer according to claim 1, wherein the suspending part is in a geometric shape, or a geometric representation which is subjectively pleasing or significant, of sufficient size to provide buoyancy to the water thermometer.

3. The water thermometer according to claim 1, wherein the lighting assembly further comprises a first solar cell arranged at an upper end of the second light producing component away from the circuit board.

4. The water thermometer according to claim 1, wherein the lighting assembly further comprises a first solar cell arranged at an upper end of the circuit board away from the mounting base.

5. The water thermometer according to claim 1, further comprising a sealing ring arranged between the mounting base and the suspending part to prevent water from entering the suspending part.

6. The water thermometer according to claim 1, further comprising a mounting plate arranged in the housing, wherein the thermometer assembly is mounted on the mounting plate.

7. The water thermometer according to claim 6, wherein the mounting plate defines a mounting groove, and the thermometer assembly is engaged in the mounting groove.

8. The water thermometer according to claim 6, wherein the mounting plate is provided with at least two elastic fasteners configured to fasten the thermometer assembly onto the mounting plate.

9. The water thermometer according to claim 6, further comprising a protective case arranged in the housing, wherein the mounting plate is received in the protective case.

10. The water thermometer according to claim 9, further comprising weights arranged at a bottom end of the housing away from the suspending part.

11. The water thermometer according to claim 10, further comprising a bottom base connected to the bottom end of the housing, wherein the weights are arranged in the bottom base.

12. A water thermometer, comprising:
    a housing;
    a thermometer assembly arranged in the housing;
    a suspending part connected to the housing; and
    a lighting assembly arranged in the suspending part and configured to illuminate the thermometer assembly;
    wherein the lighting assembly comprises a circuit board, at least one light producing component arranged at the circuit board, and a battery electrically connected to the circuit board;
    wherein the lighting assembly further comprises a mounting base, the suspending part and the housing are connected to two opposite sides of the mounting base, and the circuit board is connected to the mounting base;
    wherein the lighting assembly further comprises a first solar cell arranged at an upper end of the circuit board away from the mounting base; and
    wherein the first solar cell is attached to the circuit board through an Ethylene Vinyl Acetate mat.

13. The water thermometer according to claim 12, wherein the lighting assembly further comprises a lampshade connected at the mounting base and configured to cover the lighting assembly.

14. A water thermometer, comprising:
    a housing;
    a thermometer assembly arranged in the housing;
    a suspending part connected to the housing; and
    a lighting assembly arranged in the suspending part and configured to illuminate the thermometer assembly;
    wherein the lighting assembly comprises a circuit board, at least one light producing component arranged at the circuit board, and a battery electrically connected to the circuit board;
    wherein the lighting assembly further comprises a mounting base, the suspending part and the housing are connected to two opposite sides of the mounting base, and the circuit board is connected to the mounting base;

wherein the lighting assembly further comprises a lampshade connected at the mounting base and configured to cover the lighting assembly; and wherein the lighting assembly further comprises a solar cell arranged at an upper end of the lampshade away from the mounting base.

15. The water thermometer according to claim 14, wherein the lighting assembly further comprises a control assembly, the mounting base defines a through hole, the control assembly comprises a silicon button extending through the through hole and a key structure electrically connected at the circuit board, the silicon button corresponds to the key structure and is configured to activate the key structure when being pressed to light on/off the at least one light producing component.

\* \* \* \* \*